US012276383B2

(12) United States Patent
Chen

(10) Patent No.: US 12,276,383 B2
(45) Date of Patent: Apr. 15, 2025

(54) MULTISTAGE PARALLEL TYPE LOOP-FREE DECORATIVE LIGHT STRING

(71) Applicant: Dongguan LianRun Lighting Co., Ltd., Dongguan (CN)

(72) Inventor: Kunpeng Chen, Dongguan (CN)

(73) Assignee: DONGGUAN LIANRUN LIGHTING CO., LTD., Dongguan (CN)

( * ) Notice: Subject to any disclaimer, the term of this patent is extended or adjusted under 35 U.S.C. 154(b) by 0 days.

(21) Appl. No.: 18/395,576

(22) Filed: Dec. 24, 2023

(65) Prior Publication Data

US 2024/0125439 A1 Apr. 18, 2024

(30) Foreign Application Priority Data

Dec. 5, 2023 (CN) ......................... 202323298223.4

(51) Int. Cl.
*F21S 4/10* (2016.01)
*F21V 21/002* (2006.01)

(52) U.S. Cl.
CPC .............. *F21S 4/10* (2016.01); *F21V 21/002* (2013.01)

(58) Field of Classification Search
CPC .......... F21V 17/12; F21V 17/08; F21V 23/06; F21V 21/002; F21S 4/10
See application file for complete search history.

(56) References Cited

U.S. PATENT DOCUMENTS 6,817,733 B2 * 11/2004 Frei ......................... F21S 6/001 362/249.06
7,118,249 B2 * 10/2006 Hsu ......................... F21V 21/08 362/249.06
10,047,913 B1 * 8/2018 Hsu .......................... H01K 1/34
10,408,392 B2 * 9/2019 Yu ............................ F21S 4/10
10,823,376 B1 * 11/2020 Wang .................. F21V 19/0025
10,886,714 B2 * 1/2021 Kawashita ......... H01R 13/6592
10,900,656 B1 * 1/2021 Wang ........................ F21V 3/00
11,391,421 B2 * 7/2022 Huang .................. F21V 17/101
12,013,103 B1 * 6/2024 Liang .................... F21V 21/002
12,055,275 B1 * 8/2024 Zou ........................... F21S 4/10
2005/0286255 A1 * 12/2005 Sugar ........................ F21S 4/10 362/653
2009/0256485 A1 10/2009 Huang et al.
2009/0273928 A1 11/2009 Rizopoulos
2012/0281398 A1 11/2012 King
(Continued)

FOREIGN PATENT DOCUMENTS

CN 113464853 A * 10/2021

OTHER PUBLICATIONS

Machine translation of CN-113464853-A (Year: 2021).*

*Primary Examiner* — Christopher E Dunay
(74) *Attorney, Agent, or Firm* — Hemisphere Law, PLLC; Zhigang Ma

(57) ABSTRACT

The present disclosure relates to the technical field of lamps and discloses a multistage parallel type loop-free decorative light string, which includes a main power cable and at least one branch power cable connected in parallel to the main power cable, wherein a connection between the main power cable and the branch power cable is externally sleeved with a light string connector; and the branch power cable is electrically connected with a plurality of second lamps. A lamp cover is provided with a wire hiding slot that can store a tail end of the branch power cable.

8 Claims, 10 Drawing Sheets

(56) References Cited

U.S. PATENT DOCUMENTS

| | | | | |
|---|---|---|---|---|
| 2016/0061432 | A1* | 3/2016 | Bogart | H05B 45/382<br>315/201 |
| 2017/0138577 | A1* | 5/2017 | Lin | H02G 15/117 |
| 2020/0032986 | A1* | 1/2020 | Zhang | F21S 4/10 |
| 2021/0156530 | A1* | 5/2021 | Huang | F21V 1/12 |
| 2023/0332760 | A1* | 10/2023 | Chen | F21V 23/06 |

* cited by examiner

MULTISTAGE PARALLEL TYPE LOOP-FREE DECORATIVE LIGHT STRING

TECHNICAL FIELD

The present disclosure relates to the technical field of lamps, and in particular, to a multistage parallel type loop-free decorative light string.

BACKGROUND

With the development of modern society, electricity has been widely used. Both daily lives and entertainment gatherings cannot go well without lamps. The lamps have become an essential object in the daily lives. A decorative light string is one of the most frequently used lamps, which can not only meet a lighting requirement, but also be used for decorating environments and generate different artistic effects.

Chinese patent CN202123399837.2 discloses a structurally improved light string assembly, which includes a series-connection power cable, a male connector, and a female connector. The series-connection power cable includes a positive wire and a negative wire. The structurally improved light string assembly further includes several lamp bulbs that are electrically connected in series through the series-connection power cable and arranged at intervals in sequence. Each lamp bulb is provided with a wire clamping hanger. In the prior art, in order to improve the decorative effect of a light string, several lamps are arranged in the middle of the power cable in a suspended manner. However, lamp styles are consistent, so the decorativeness of the light string still cannot meet the existing usage requirement. To combine various lamp styles, a plurality light strings need to be purchased and connected, and are combined to a female socket through plugs for use. However, this method requires a plenty of sockets to be mounted outdoors. The light string is inconvenient to carry and use, and the cost is high. On the other hand, due to the fact that the lamps are connected in series to the power cable, positive and negative wires of the power cable need to pass back through the T-shaped wire clamping box and return to the power cable after being electrically connected to the lamps through a T-shaped wire clamping box. This lamp connection method has the defect that the entire light string will be damaged if one lamp is damaged, and a hanging line has a large volume, which is not attractive. In view of this, the inventor has made a new invention.

SUMMARY

The present disclosure aims to provide a multistage parallel type loop-free decorative light string for the shortcomings in the prior art. This parallel type loop-free decorative light string has the characteristic of high decorativeness.

In order to achieve the above objective, the present disclosure provides a multistage parallel type loop-free decorative light string, including a main power cable, wherein a first positive wire and a first negative wire are arranged inside the main power cable; one end of the main power cable is connected to a male plug, and the other end is connected to a female socket; a plurality of first lamps are connected in parallel in the middle of the main power cable; the light string further includes at least one branch power cable connected in parallel to the main power cable; a second positive wire and a second negative wire are arranged inside the branch power cable; metal terminals are arranged at end portions of both the second positive wire and the second negative wire; the second positive wire and the first positive wire are crimped through the metal terminal, and the second negative wire and the first negative wire are crimped through the metal terminal; a connection between the main power cable and the branch power cable is externally sleeved with a light string connector; the light string connector is spaced apart from the first lamps; and the branch power cable is connected in parallel with at least one second lamp.

Further, each first lamp includes a first lamp holder and a first lamp bulb in threaded connection with the first lamp holder.

Preferably, a first outer lamp holder sleeves the first lamp holder; the first outer lamp holder includes a first shell and a second shell which are in buckled connection to each other; and an upper end portion of the first shell is provided with a first positioning ring buckled with an auxiliary shell.

Further, the second lamp includes a second lamp holder and a second lamp bulb in threaded connection the second lamp holder; the second lamp holder includes a holder body and a cover plate fixedly connected to the holder body; the holder body is provided with an accommodating position for being connected to the second lamp bulb; and the holder body is matched with the cover plate to form a first wire receiving slot for allowing the branch power cable to pass through.

Preferably, the cover plate is further provided with a wire hiding slot for closing, and a distributor plate for preventing short circuits is arranged inside the wire hiding slot.

Preferably, a second outer lamp holder sleeves the second lamp holder; the second outer lamp holder includes a third shell and a fourth shell which are connected to each other; and a second wire receiving slot for allowing the branch power cable to pass through is formed by tops of both the third shell and the fourth shell.

Preferably, a second positioning ring connected to the auxiliary shell is arranged at a lower end portion of the third shell.

Preferably, a lower end of the fourth shell is provided with an annular assembling part that is used in conjunction with the second positioning ring; the annular assembling part is of a structure with a narrow upper part and a wide lower part; and two end portions of the annular assembling part are inclined towards a middle part of the annular assembling part.

Further, a first connection component and a second connection component are respectively arranged on two sides of the second wire receiving slot.

Still further, each metal terminal includes a connection part, and a first winding part and a second winding part which are arranged on two sides of the connection part; the first positive wire and the second positive wire are partially placed on the connection part; and the first winding part and the second winding part cooperate with the connection part to wrap and crimp the first positive wire and the second positive wire.

Beneficial effects: Compared with the prior art, the multistage parallel type loop-free decorative light string of the present disclosure has the following advantages: 1. Combined use of various lamp styles is achieved at low costs, so that the entire light string is highly decorative. 2. A suspended lamp is connected in parallel to the main power cable through branch power cable, which can achieve loop-free electrical connection of the lamp and simplify the connection structure, with higher practicality and an ability of reducing the volume of the branch power cable. 3. The branch can achieve multistage parallel connection of the lamps, which further improves the decorativeness of the light string. 4. A lamp cover is provided with the wire hiding slots that can store a tail end of the branch power cable.

Figure 1:
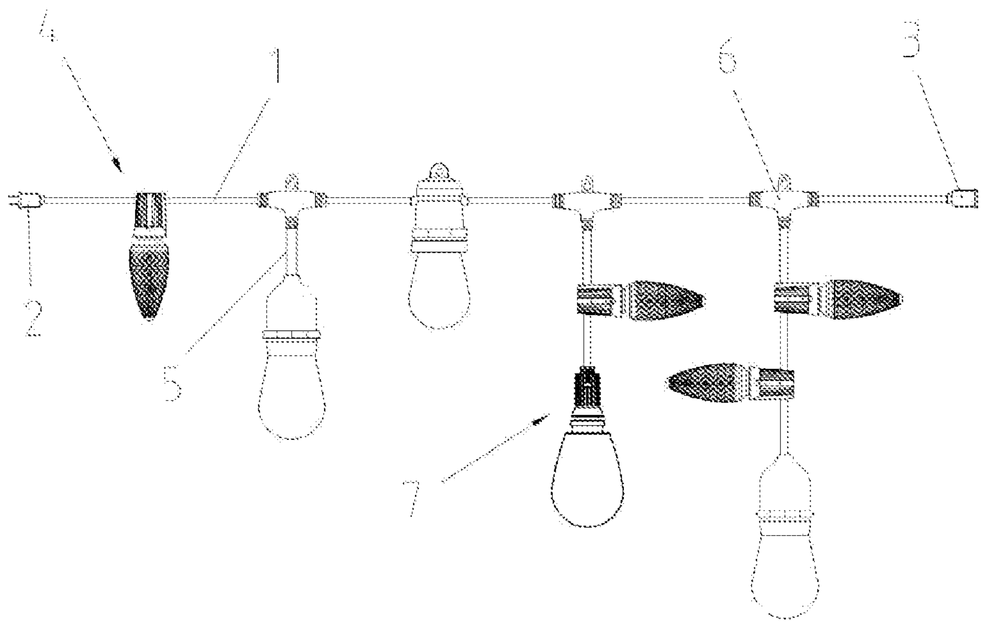
FIG. 1 is a schematic diagram of an entire structure of the present disclosure.
Figure 2:
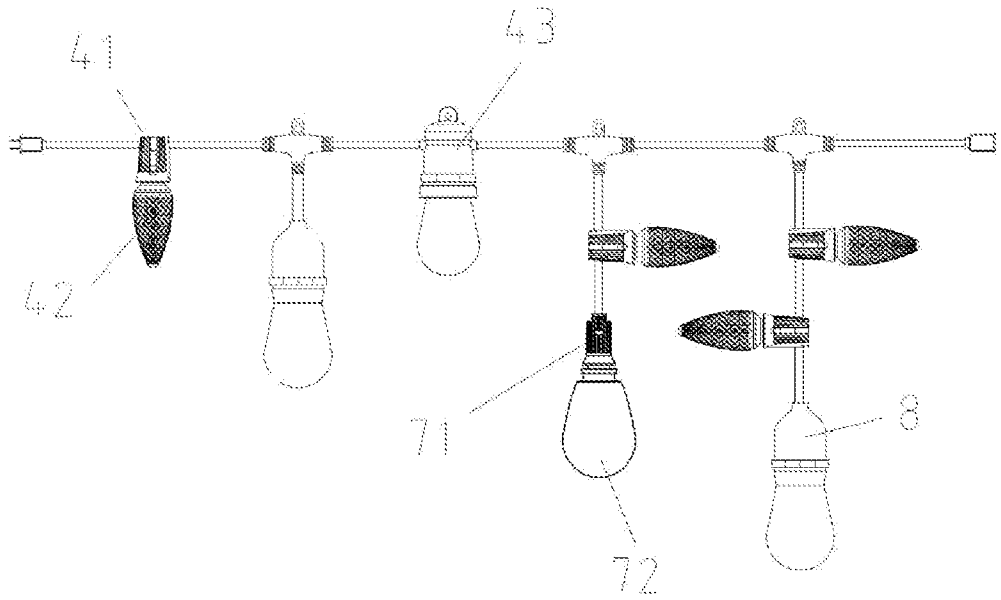
FIG. 2 is a schematic structural diagram of a first lamp and a second lamp according to the present disclosure.
Figure 3:
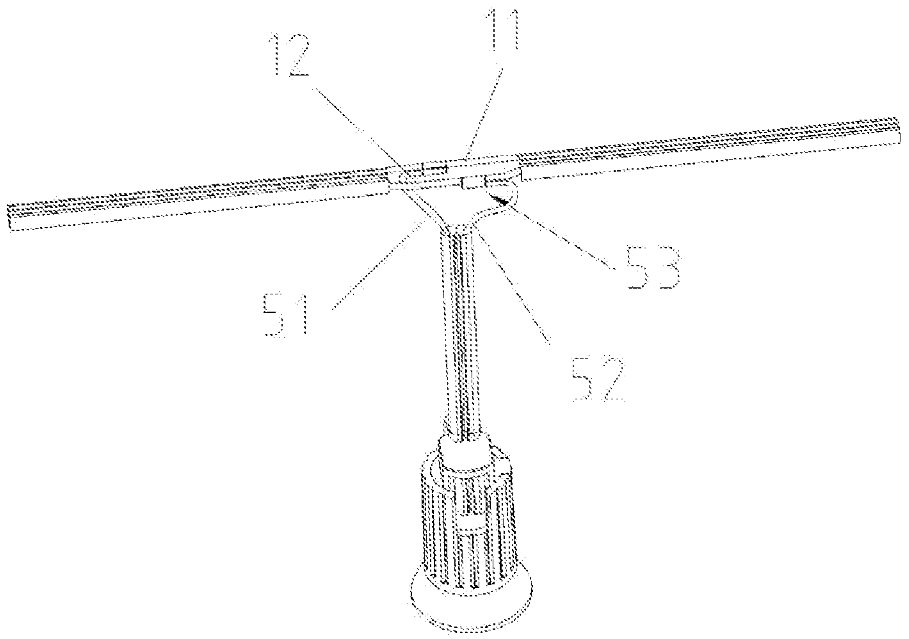
FIG. 3 is a schematic diagram of a main power cable and a branch power cable according to the present disclosure.

Reference numerals include:

main power cable 1, first positive wire 11, first negative wire 12, male plug 2, female socket 3, first lamp 4, first lamp holder 41, first lamp bulb 42, first outer lamp holder 43, first shell 431, second shell 432, first positioning ring 433, branch power cable 5, second positive wire 51, second negative wire 52, metal terminal 53, connection part 531, first winding part 532, second winding part 533, light string connector 6, second lamp 7, second lamp holder 71, holder body 711, cover plate 712, accommodating position 713, first wire receiving slot 714, wire hiding slot 715, distributor plate 716, second lamp bulb 72, second outer lamp holder 8, third shell 81, second positioning ring 811, fourth shell 82, annular assembling part 821, second wire receiving slot 83, first connection component 84, insertion tongue 841, insertion position 842, and second connection component 85.

DETAILED DESCRIPTION OF THE EMBODIMENTS

The present disclosure will be explained below in conjunction with the accompanying drawings 1 to 10.

The present disclosure discloses a multistage parallel type loop-free decorative light string, including a main power cable 1, wherein a first positive wire 11 and a first negative wire 12 are arranged inside the main power cable 1; one end of the main power cable 1 is connected to a male plug 2, and the other end is connected to a female socket 3; a plurality of first lamps 4 are connected in parallel in the middle of the main power cable 1; the light string further includes at least one branch power cable 5 connected in parallel to the main power cable 1; a second positive wire 51 and a second negative wire 52 are arranged inside the branch power cable 5; metal terminals 53 are arranged at end portions of both the second positive wire 51 and the second negative wire 52; the second positive wire 51 and the first positive wire 11 are crimped through the metal terminal 53, and the second negative wire 52 and the first negative wire 12 are crimped through the metal terminal 53; a connection between the main power cable 1 and the branch power cable 5 is externally sleeved with a light string connector 6; the light string connector 6 is spaced apart from the first lamps 4; and the branch power cable 5 is connected in parallel with at least one second lamp 7.

As shown in FIG. 1, according to the present disclosure, various lamp styles are combined at low costs to improve the decorativeness of the light string. Meanwhile, the first lamps 4 and the second lamp 7 are both connected in parallel with the main power cable 1, which is higher in practicability and can prolong the service life of the light string. On the other hand, when the second lamp 7 is connected to the main power cable 1, a loop is not needed. A connection structure of a suspended lamp is more concise, which can effectively reduce the volume of the branch power cable 5 and make it more aesthetically pleasing. The branch can be connected in parallel to a plurality of second lamps 7. The multistage parallel connection of the second lamps 7 is no longer electrical connection between a plug and female socket of a traditional connector. Instead, the wires inside the branch power cable 5 and the main power cable 1 are crimped through the metal terminals 53, and the light string connector 6 is integrally formed outside through injection molding. This structure is lower in cost and attractive in appearance, and is firmly connected, and a tensile force that the structure can bear is much greater than a tensile force of a traditional socket type connection method. A test shows that the branch of the light string of the present disclosure can bear a tensile force of about 30 ponds.

As an embodiment, the main power cable 1 is directly electrically connected with the plurality of first lamps 4, and each first lamp 4 includes a first lamp holder 41 and a first lamp bulb 42 in threaded connection with the first lamp holder 41. The first lamp bulb 42 can be replaced with different styles of lamp bulbs according to an actual situation to increase the fun of the light string.

In order to protect the first lamp holder 41 and further improve the decorativeness and waterproof performance of the first lamp holder 41, a first outer lamp holder 43 can be selectively used to sleeve the first lamp holder 41. For the convenience of sleeving and replacement, the first outer lamp holder 43 is a split type lamp holder. The first outer lamp holder 43 includes a first shell 431 and a second shell 432; and an upper end portion of the first shell 431 is provided with a first positioning ring 433 buckled with an auxiliary shell. During use, the first shell 431 is placed on one side of the first lamp holder 41, and a lower end of the second shell 432 is inserted into the first positioning ring 433 to achieve shell positioning. Then, the two shells are pressed to be buckled to complete the assembling of the first outer lamp holder 43.

As another embodiment, the second lamp 7 includes a second lamp holder 71 and a second lamp bulb 72 in threaded connection with the second lamp holder 71, and a plurality of second lamp bulbs 72 can also be of different styles. The second lamp holder 71 of this technical solution includes a holder body 711 and a cover plate 712 fixedly connected to the holder body 711. An accommodating position 713 with an opening is formed in a middle position of the holder body 711, and an internal thread part for screwing the lamp bulb into the lamp holder is arranged on a side wall of the accommodating position 713. The holder body 711 is used in conjunction with the cover plate 712 to form a first wire receiving slot 714 for allowing the branch power cable 5 to pass through, and the second lamp holder 71 is connected in parallel with the branch power cable 5.

Figure 4:
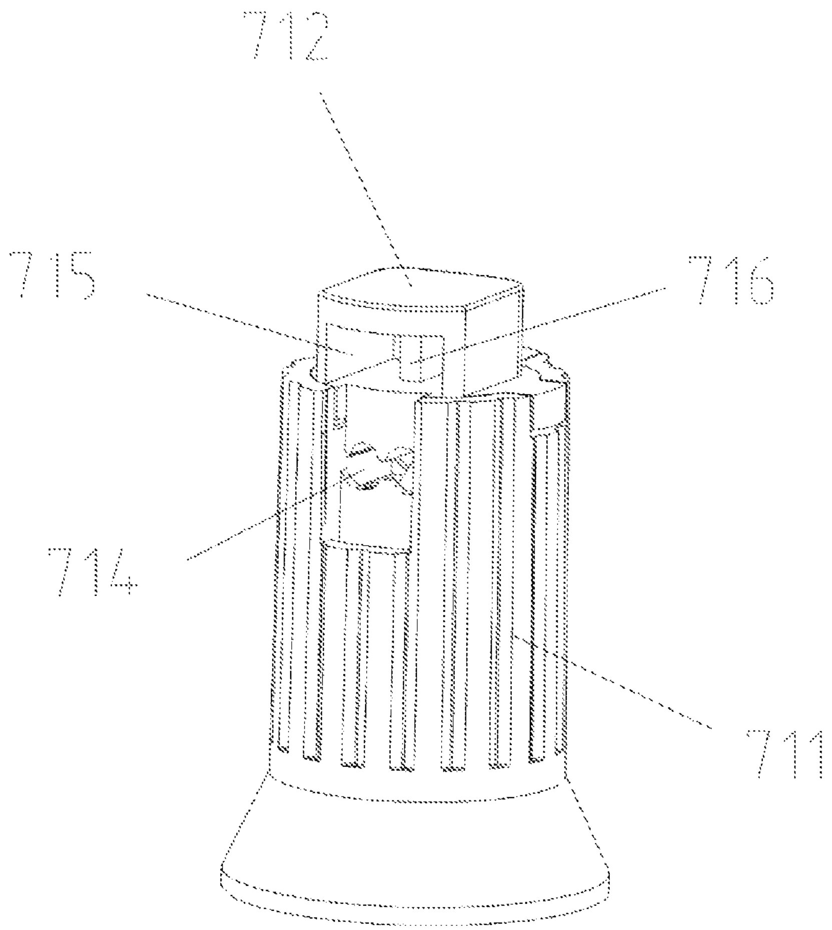
FIG. 4 is a schematic structural diagram of a second lamp holder according to the present disclosure.
Figure 5:
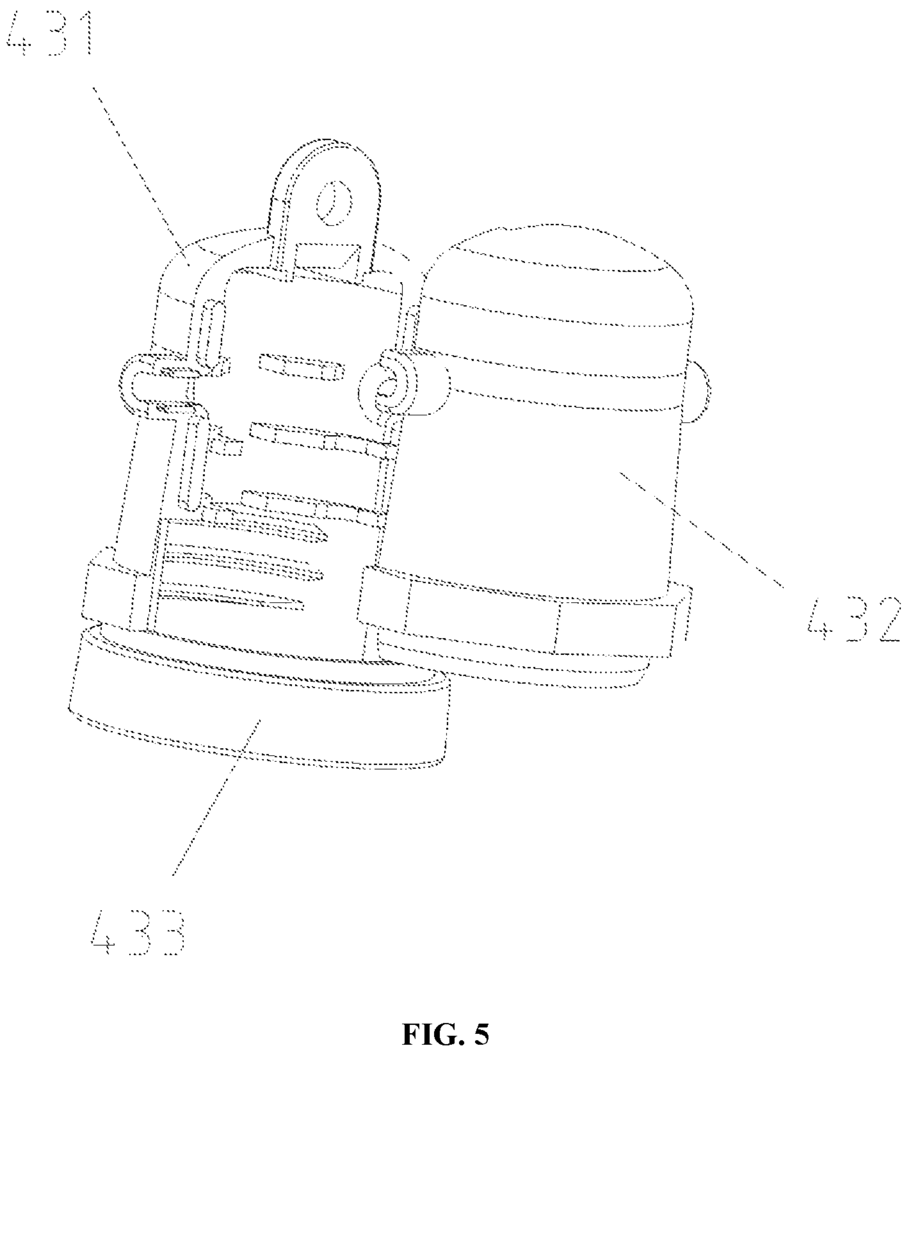
FIG. 5 is a schematic structural diagram of a first outer lamp holder according to the present disclosure.
Figure 6:
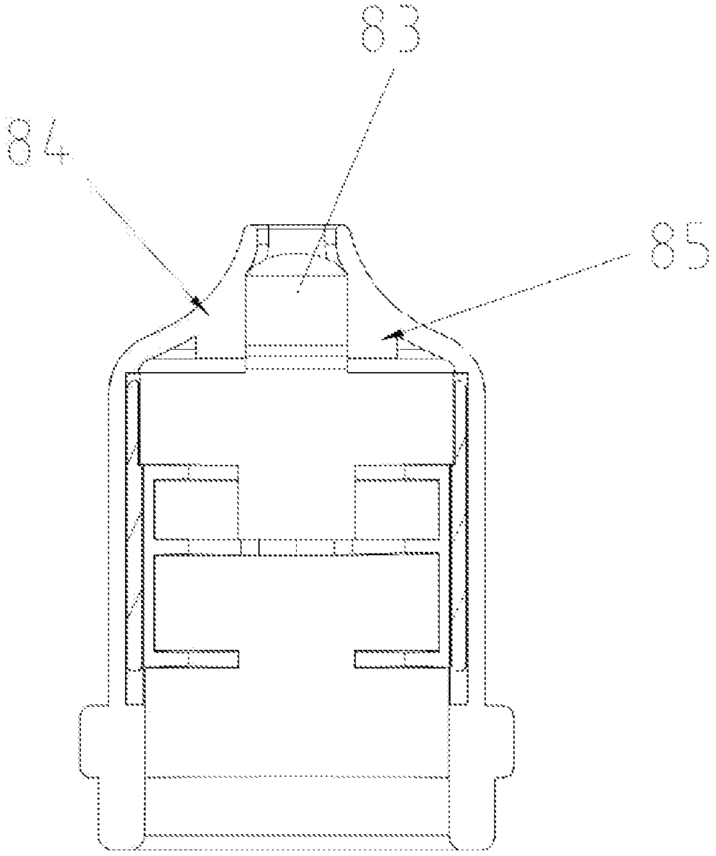
FIG. 6 is a schematic structural diagram of a longitudinal cross section of a second outer lamp holder according to the present disclosure.

In order to further improve the technical solution, as shown in FIG. 4, when the second lamp holder 71 is mounted at a tail end of a line, the cover plate 712 is further provided with a wire hiding slot 715. As the branch power cable 5 does not have a loop, the wire hiding slot 715 can be configured to store a tail end of the branch power cable 5 to prevent the exposed tail end of the power cable from affecting the aesthetics and safety of the entire light string, Meanwhile, a distributor plate 716 is arranged inside the wire hiding slot 715. The distributor plate 716 separates the second positive wire 51 from the second negative wire 52 to prevent contact between the wires to cause a short circuit. The distributor plate 716 can also be used in conjunction with the entire wire hiding slot 715 to fix the tail end of the power cable.

As a preferred option, a second outer lamp holder 8 sleeves the second lamp holder 71. A function of the second outer lamp holder 8 is the same as that of the first outer lamp holder 43. The second outer lamp holder 8 includes a third shell 81 and a fourth shell 82 which are connected to each other; and a second wire receiving slot 83 for allowing the branch power cable 5 to pass through is formed by tops of both the third shell 81 and the fourth shell 82. After the tail end of the branch power cable 5 is connected to the second lamp 7, the second lamp 7 is easily inclined and has an unstable angle. At this time, by sleeving the second lamp with the second lamp holder 71, the second lamp holder 71 and the second wire receiving slot 83 can be used to adjust the angle of the second lamp 7, so that the second lamp 7 at the tail end of the branch power cable 5 can be prevented from showing a decorative effect of a suspended lamp.

Similarly, a second positioning ring 811 connected to the auxiliary shell is arranged at a lower end portion of the third shell 81. A lower end of the fourth shell 82 is provided with an annular assembling part 821 that is used in conjunction with the second positioning ring 811. The third shell 81 is placed on one side of the second lamp holder 71, and the annular assembling part of the fourth shell 82 is inserted into the second positioning ring 811 to position and press the two shells, thus completing the assembling of the second outer lamp holder 8.

Figure 7:
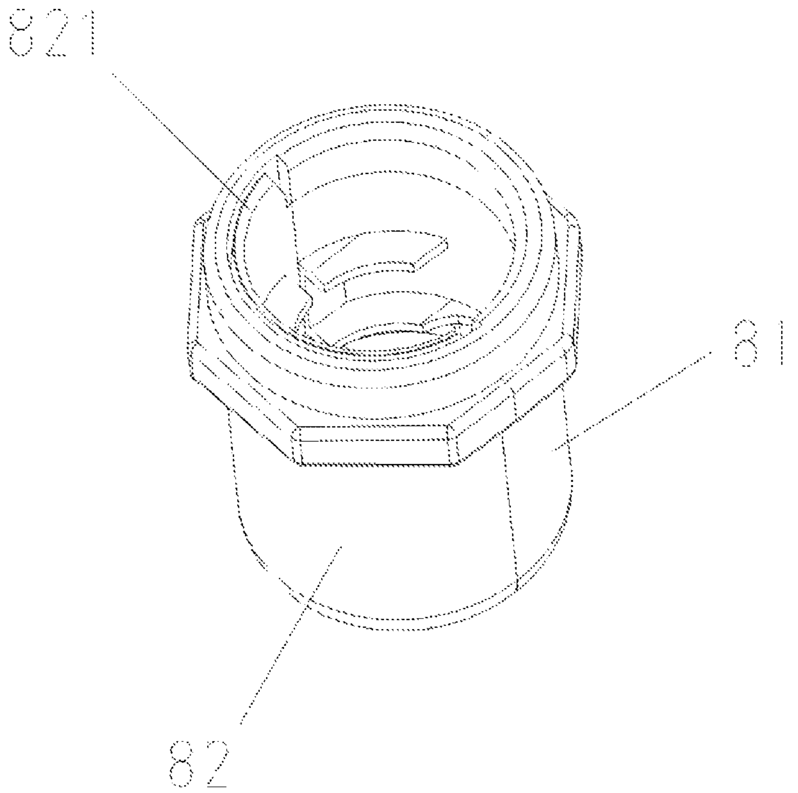
FIG. 7 is a schematic diagram of an entire structure of a second outer lamp holder according to the present disclosure.
Figure 8:
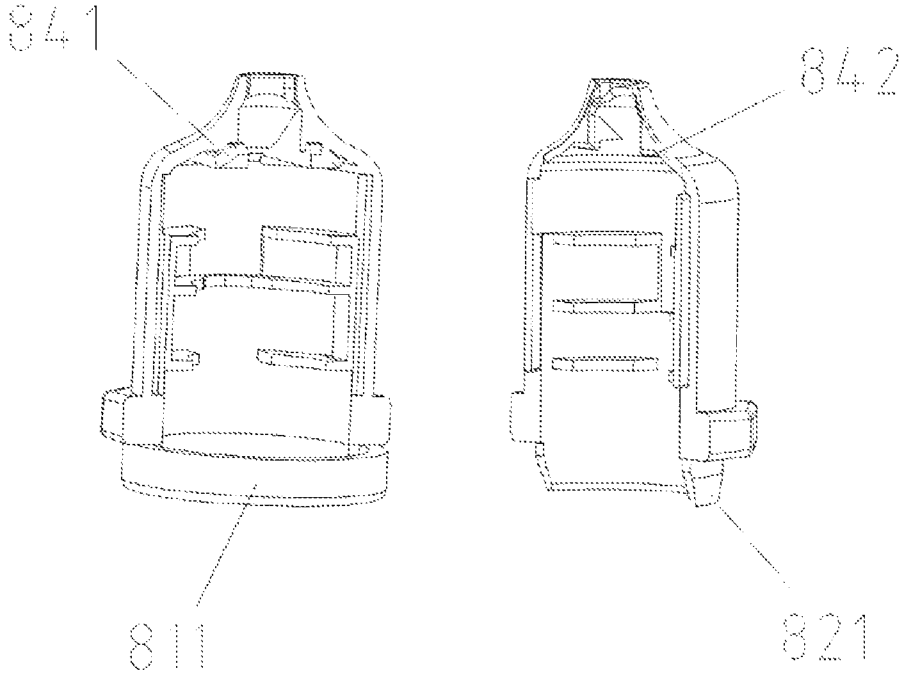
FIG. 8 is a schematic structural diagram of a third shell and a fourth shell according to the present disclosure.
Figure 9:
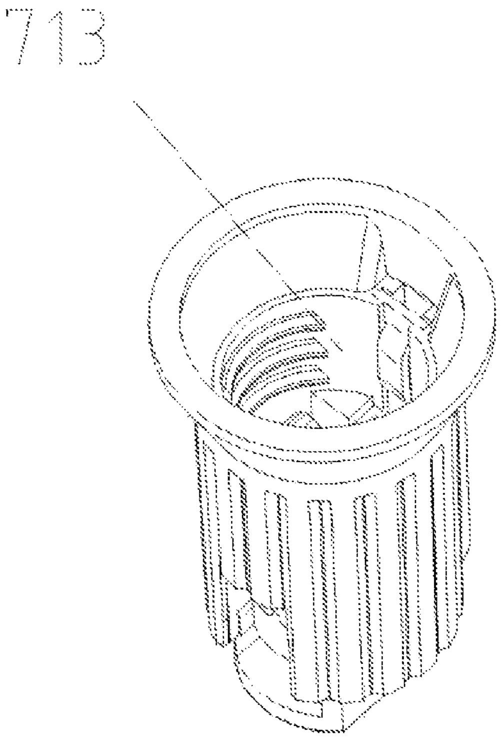
FIG. 9 is a schematic structural diagram of a first lamp holder according to the present disclosure.
Figure 10:
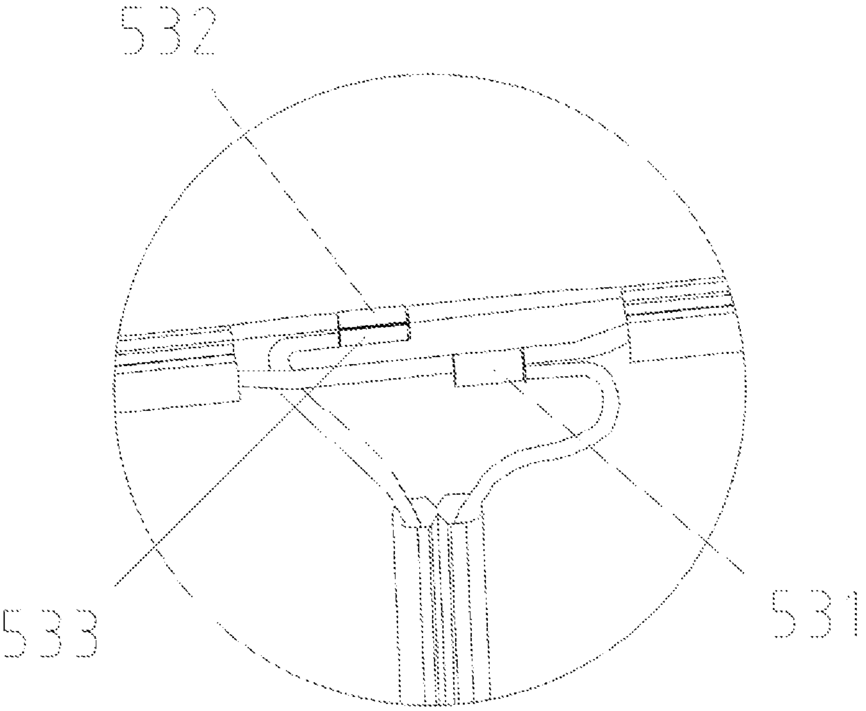
FIG. 10 is a schematic structural diagram of a metal terminal according to the present disclosure.

In order to accelerate the assembling of the second outer lamp holder 8, the inventor sets the annular assembling part 821 as to be a structure with a narrow upper part and a wide lower part, without reducing the intensity of the annular assembling part 821, so that the volume of a front end of the annular assembling part 821 decreases, and the probability of insertion into the second positioning ring 811 increases. On the other hand, as shown in FIG. 7, two ends of the annular assembling part 821 are inclined towards the middle of the annular assembling part 821, that is, the two ends of the annular assembling part 821 are inclined and closed towards the middle, making it difficult to cause abrasion between the annular assembling part 821 and the second positioning ring 811. When the annular assembling part 821 is assembled with the second positioning ring 811, two buffer gaps will be formed at the two ends. Even if there is a slight difference in sizes between the shells, the shells can be assembled smoothly.

As still another embodiment, a first connection component 84 and a second connection component 85 are respectively arranged on two sides of the second wire receiving slot 83. Lower ends of both the third shell 81 and the fourth shell 82 are assembled into a whole through the second positioning ring 811 and the annular assembling part 821, and upper ends of the shells are fixed by the two symmetrically arranged connection components.

In this technical solution, the first connection component 84 includes an insertion tongue 841 and a insertion position 842. The insertion tongue 841 is arranged on the third shell 81, and the insertion position 842 is arranged on the fourth shell 82. The insertion tongue 841 is clamped into the insertion position 842 to achieve a fixed connection between the shells. This embodiment has a simple structure and is more convenient to assemble, without the help of other tools. The structure of the second connection component 85 is the same as that of the first connection component 84.

As a preferred option, each metal terminal 53 includes a connection part 531, and a first winding part 532 and a second winding part 533 which are arranged on two sides of the connection part 531; when the main power cable and the branch power cable are welded, the first positive wire 11 and the second positive wire 51 are integrated into one strand and are horizontally placed on the connection part 531; the first winding part 532 and the second winding part 533 are rolled up to cooperate with the connection part 531 to wrap the first positive wire 11 and the second positive wire 51 and firmly crimp the first positive wire 11 and the second positive wire 51 into a whole; and the first negative wire 12 and the second negative wire 52 are also connected in this way. In this connection way, every two of the wires are horizontally crimped through the two horizontal metal terminals 53. The horizontal crimping makes the wires inside the power cables extremely high in bearing capacity. The crimped power cables are then injection-molded with the light string connector 6, which can significantly improve the bearing capacity to distinguish the power cables from traditional power cable connection.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. A multistage parallel type loop-free decorative light string, comprising a main power cable (1), wherein a first positive wire (11) and a first negative wire (12) are arranged inside the main power cable (1); one end of the main power cable (1) is connected to a male plug (2), and the other end is connected to a female socket (3); a plurality of first lamps (4) are connected in parallel in the middle of the main power cable (1); the light string further comprises at least one branch power cable (5) connected in parallel to the main power cable (1); a second positive wire (51) and a second negative wire (52) are arranged inside the branch power cable (5); metal terminals (53) are arranged at end portions of both the second positive wire (51) and the second negative wire (52); the second positive wire (51) and the first positive wire (11) are crimped through the metal terminal (53), and the second negative wire (52) and the first negative wire (12) are crimped through the metal terminal (53); a connection between the main power cable (1) and the branch power cable (5) is externally sleeved with a light string connector (6); the light string connector (6) is spaced apart from the first lamps (4); and the branch power cable (5) is connected in parallel with at least one second lamp (7);

wherein the second lamp (7) comprises a second lamp holder (71) and a second lamp bulb (72) in threaded connection the second lamp holder (71); the second lamp holder (71) comprises a holder body (711) and a cover plate (712) fixedly connected to the holder body (711); the holder body (711) is provided with an accommodating position (713) for being connected to the second lamp bulb (72); and the holder body (711) is matched with the cover plate (712) to form a first wire receiving slot (714) for allowing the branch power cable (5) to pass through; and wherein the cover plate (712) is further provided with a wire hiding slot (715) for closing, and a distributor plate (716) for preventing short circuits is arranged inside the wire hiding slot (715).

2. The multistage parallel type loop-free decorative light string according to claim 1, wherein each first lamp (4) comprises a first lamp holder (41) and a first lamp bulb (42) in threaded connection with the first lamp holder (41).

3. The multistage parallel type loop-free decorative light string according to claim 2, wherein a first outer lamp holder (43) sleeves the first lamp holder (41); the first outer lamp holder (43) comprises a first shell (431) and a second shell (432) which are in buckled connection to each other; and an upper end portion of the first shell (431) is provided with a first positioning ring (433) buckled with an auxiliary shell.

4. The multistage parallel type loop-free decorative light string according to claim 1, wherein a second outer lamp holder (8) sleeves the second lamp holder (71); the second outer lamp holder (8) comprises a third shell (81) and a fourth shell (82) which are connected to each other; and a second wire receiving slot (83) for allowing the branch power cable (5) to pass through is formed by tops of both the third shell (81) and the fourth shell (82).

5. The multistage parallel type loop-free decorative light string according to claim 4, wherein a second positioning ring (811) connected to the auxiliary shell is arranged at a lower end portion of the third shell (81).

6. The multistage parallel type loop-free decorative light string according to claim 5, wherein a lower end of the fourth shell (82) is provided with an annular assembling part (821) that is used in conjunction with the second positioning ring (811); the annular assembling part (821) is of a structure with a narrow upper part and a wide lower part; and two end portions of the annular assembling part (821) are inclined towards a middle part of the annular assembling part (821).

7. The multistage parallel type loop-free decorative light string according to claim 4, wherein a first connection component (84) and a second connection component (85) are respectively arranged on two sides of the second wire receiving slot (83).

8. The multistage parallel type loop-free decorative light string according to claim 1, wherein each metal terminal (53) comprises a connection part (531), and a first winding part (532) and a second winding part (533) which are arranged on two sides of the connection part (531); the first positive wire (11) and the second positive wire (51) are partially placed on the connection part (531); and the first winding part (532) and the second winding part (533) cooperate with the connection part (531) to wrap and crimp the first positive wire (11) and the second positive wire (51).

* * * * *